United States Patent Office 3,246,640
Patented Apr. 19, 1966

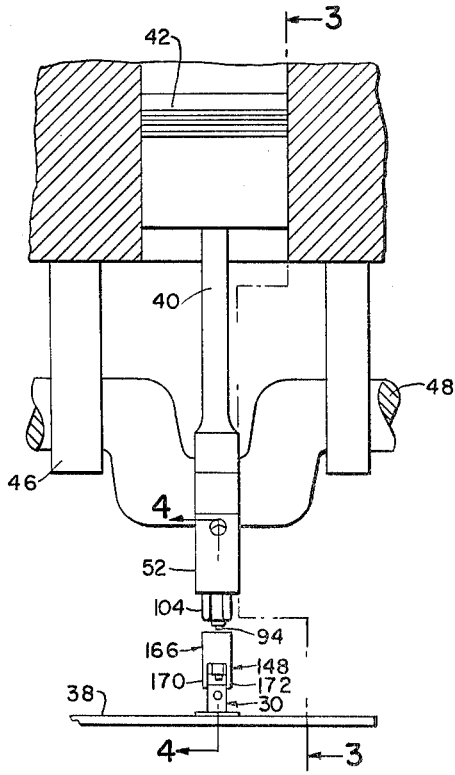
FIG. 2.
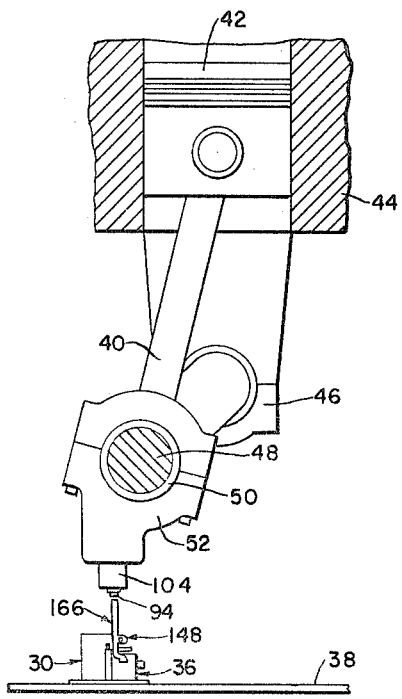
FIG. 3.
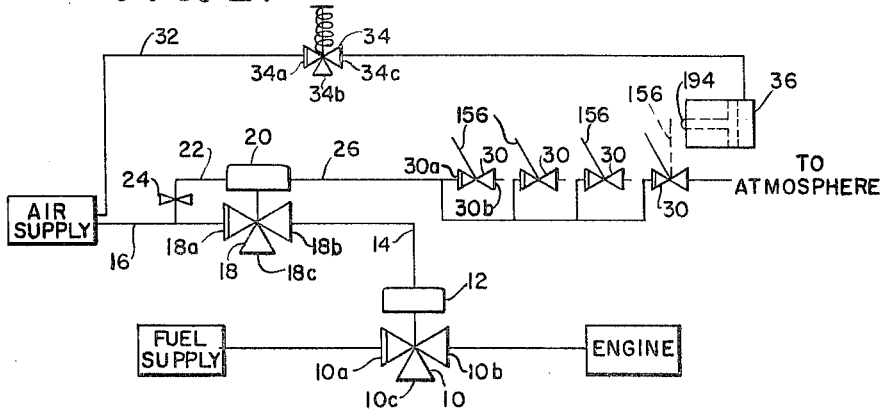
FIG. I.
INVENTOR
Joseph P. Wagner
JESSE P. MORGAN
BY Birch and O'Brien
ATTORNEYS

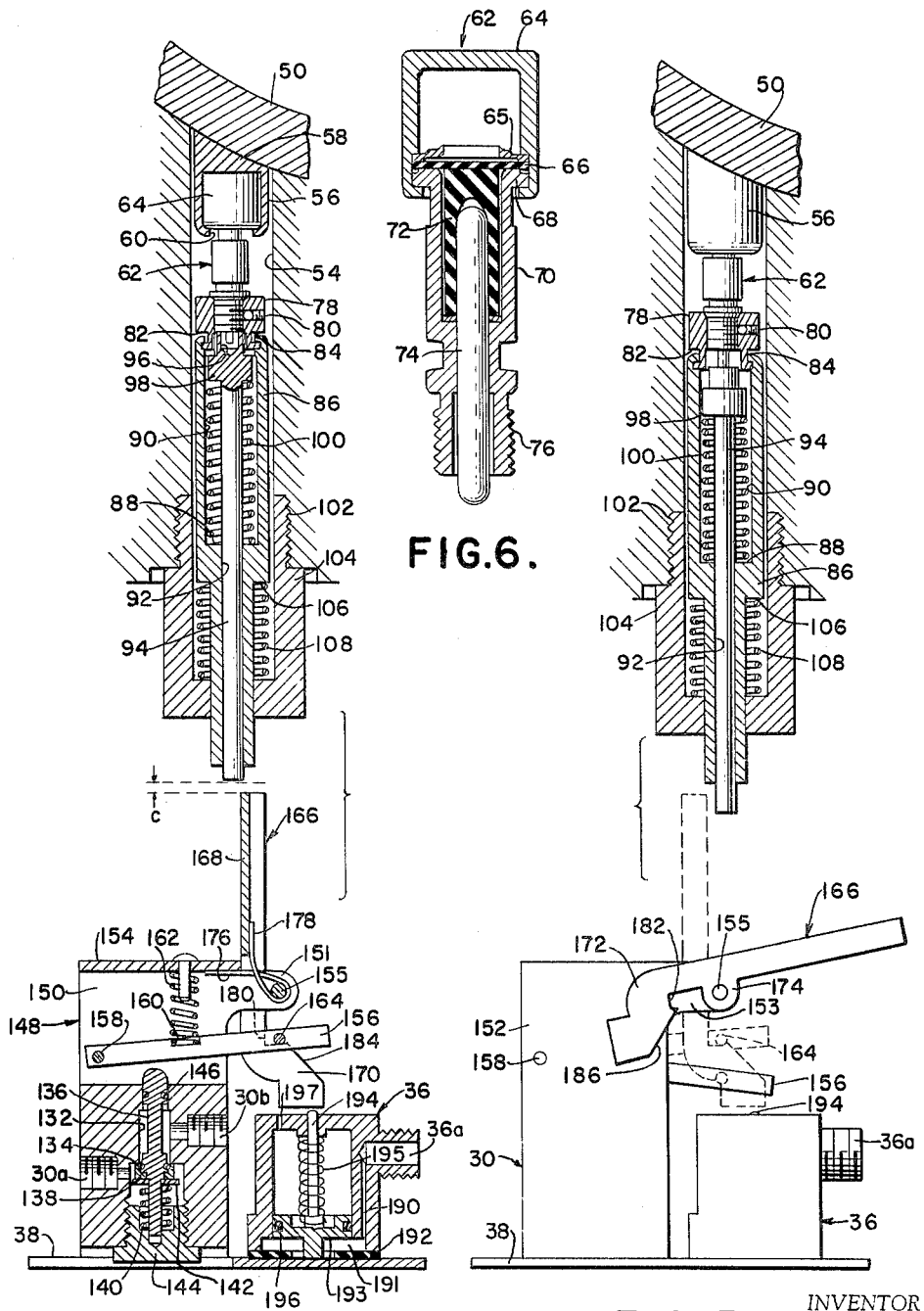

3,246,640
BEARING TEMPERATURE AND WEAR
SENSING DEVICE
Joseph P. Wagner and Jesse P. Morgan, Knoxville, Tenn.,
assignors to Robertshaw Controls Company, Richmond,
Va., a corporation of Delaware
Filed Apr. 29, 1964, Ser. No. 363,510
9 Claims. (Cl. 123—198)

This invention relates to safety control devices for prime movers such as internal combustion engines and more particularly to such devices for sensing temperature and wear of a bearing in such engines.

It is conventional practice to monitor the bearing of a connecting rod in an engine so as to effect shut down of the engine upon excessive wear; it is also conventional to similarly monitor such a bearing to effect shut down upon excessive temperature. However, none of the known monitoring devices will perform the dual function of sensing both wear and temperature of such bearings.

It is, therefore an object of this invention to monitor both wear and temperature of a bearing with a single monitoring device.

The present invention has another object in that shut down of an engine is effected by a control device actuated by a bearing wear and temperature sensor.

The present invention has another object in that the trip mechanism of an engine control device is actuated by a bearing wear and temperature sensor.

It is another object of the present invention to reset automatically the actuated trip mechanism of an engine control device.

Still another object of the present invention is to provide an engine bearing monitoring device with a specially shaped contacting element conforming to the shape of the bearing.

The present invention has a further object in that a temperature sensing element is disposed adjacent an engine bearing for accurate response thereto.

It is a further object of the present invention to provide an engine bearing monitoring device with a pair of movable actuators, both of which move in response to bearing wear and one of which has a relative movement in response to bearing temperature.

In achieving the foregoing and other objects and in practicing the present invention, a preferred embodiment includes a control means which is operative to effect shut down of an engine, bearing means for the engine, and a single sensing means to actuate the control means in response to an abnormal wear condition or an abnormal temperature condition of said bearing means. In addition automatic restoration means are provided to restore the control means to an engine operating position.

Other objects and advantages of the present invention will be apparent from the following description of a preferred embodiment taken in connection with the accompanying drawings wherein:

FIGURE 1 is a schematic diagram of a control circuit for an engine embodying the present invention;

FIGURE 2 is a partial view of an engine embodying the present invention;

FIGURE 3 is a section view taken along the staggered line 3—3 of FIGURE 2;

FIGURE 4 is a longitudinal section view taken along line 4—4 of FIGURE 2 but shown on an enlarged scale;

FIGURE 5 is a view similar to FIGURE 4 with parts in elevation but showing the elements in another operating position; and FIGURE 6 is a longitudinal section of a detail of FIGURE 4 but shown on an enlarged scale.

As is illustrated in FIGURE 1, the present invention is shown as applied to an internal combustion engine to which the fuel supply is controlled by a safety fuel valve 10. The valve 10 includes an inlet port 10a, an outlet port 10b and a vent port 10c; the double lines at port 10a indicates that port 10a is closed and communication is established between ports 10b and 10c. When moved to an open position, the port 10c is closed and communication is established between ports 10a and 10b to supply fuel to the engine. The safety fuel valve 10 may be of any suitable construction and is moved to and maintained in an open position during engine operation by diaphragm means 12 which is pressured by a pneumatic conduit 14.

Flow from a pneumatic source enters a main conduit 16 and flows through a relay valve 18 to the conduit 14. The relay valve 18 includes an inlet port 18a, an outlet port 18b and a vent port 18c, which ports are controlled in the same manner as the ports 10a, 10b and 10c in valve 10. The relay valve 18 is moved to and maintained in an open position by diaphragm means 20 which is pressurized by a pneumatic conduit 22 that establishes communication between the inlet of the diaphragm means and the main conduit 16 upstream of the relay valve 18. A restricting orifice 24 in the conduit 22 restricts the pneumatic flow to the diaphragm means 20 for a purpose to be described hereinafter. The outlet of the diaphragm means 20 communicates with a pneumatic conduit 26 that includes a suitable number of blocking valves 30, each of which has an inlet port 30a and a vent port 30b opening to the atmosphere. The number of blocking valves 30 depends upon the number of connecting rods in the particular engine. A parallel flow from the air supply enters a conduit 32 which is controlled as by a push button three-way valve 34 and which leads to a pneumatic actuator 36 for a purpose to be described more fully hereinafter. It is to be understood that there is a pneumatic actuator 36 for each valve 30 while only one has been shown for the sake of brevity.

As is illustrated in FIGURE 2, the pneumatic control devices 30 and 36 are securely mounted to an appropriate part 38 of an internal combustion engine so as to be aligned with the path of travel of a connecting rod assembly. The connecting rod 40 carries a piston 42 on its upper end for reciprocation in the cylinder of the engine block 44 which includes supports for the main bearings 46 of a crankshaft 48 as is well-known in the art. The lower end of the connecting rod 40 includes a bearing liner 50 on the crankshaft 48 and a bolted connecting rod cap 52.

The connecting rod cap 52 has a longitudinal bore 54 which carries the combined wear and temperature sensor for the bearing 50. As is shown in FIGURE 4, a cup-shaped element 56 has an external bottom wall 58 formed in an arcuate shape to conform to the shape of the adjacent portion of the bearing 50 for engagement therewith to effect good thermal conductivity. The lip of the cup 56 is deformed inwardly at 60 so as to be staked to the casing 64 of a thermally responsive power element indicated generally at 62. The casing 64 is cup-shaped and filled with a suitable heat responsive material; its mouth end is sealed and closed by means of a back-up washer 65 seated in an annular recess which also receives a rubber diaphragm 66 and the outwardly bent end flange 68 of a hollow cylinder 70; the mouth of the casing 64 is staked over the flange 68 to retain the closure elements in assembled relation. The cylinder 70 has a large upper bore which receives a sleeve 72 of suitable elastic material that has a closed flat end in engagement with the diaphragm 66. A stem 74 has its upper end disposed in the sleeve 72 and its lower end protruding out of the cylinder 70. The lower part of cylinder 70 is externally threaded at 76 to receive a collar 78 that is locked in place by a set screw 80.

The collar 78 has an annular groove 82 in which the end 84 of a cylindrical housing 86 is staked to form a unitary assembly with the power element 62. The interior of the housing 86 is longitudinally counterbored to define an internal shoulder 88 between an upper bore 90 and a lower bore 92 which forms a close guide for a stem or plunger 94. The upper part of plunger 94 is recessed at 96 to receive the protruding end of the power element stem 74; slightly below the recess 96, the plunger 94 is enlarged to define an annular shoulder 98. A return coil spring 100 in the bore 90 encircles the plunger 94 and is mounted in compression between the two shoulders 88 and 98. The lower part of the cap bore 54 is enlarged and threaded at 102 to receive the threaded end of a hollow retainer nut 104. The lower part of cylinder housing 86 is externally reduced to define an annular shoulder 106 and the reduced portion projects through the bottom wall of the nut 104. A retainer coil spring 108 in the nut 104 encircles the reduced portion of the housing 86 and is mounted in compression between the bottom wall of nut 104 and the shoulder 106 whereby the assembly is biased toward the bearing 50.

Each blocking valve 30 includes a longitudinal valve chamber 132 with a valve seat 134 disposed between the staggered inlet port 30a and exhaust port 30b. A valve stem 136 centrally carries a valve seating element 138 which is biased toward a closed position by a coil spring 140. The coil spring 140 encircles the lower part of the valve stem 136 and is mounted in compression between a valve seat retainer washer 142 and a recessed closure plug 144 which seals the bottom part of the valve chamber 132. The upper part of the valve stem 136 protrudes through the casing of valve 30 and is provided with an O-ring seal 146 to seal the upper part of the valve chamber 132.

A trip mechanism, indicated generally at 148, is suitably mounted on the top of valve 30 and includes an inverted U-shaped frame having side members 150 and 152 and a connecting top member 154; the frame sides 150 and 152 are secured to upper side walls of valve 30, which walls define a slot therebetween (not shown) for mounting a lever and such side frames have forwardly projecting ears 151 and 153, respectively, which carry a hinge pin 155 therebetween. A valve stem actuating lever 156 is pivotally disposed in the valve body slot between the side members 150 and 152 so as to have an intermediate portion directly over the protruding end of valve stem 136. A pivoted end of the lever 156 is mounted on a hinge pin 158 extending through the valve body slot and between the two side members 150 and 152. The upper surface of lever 156 is recessed at 160 to receive one end of a coil spring 162 which is mounted in compression between the undersurface of frame top 154 and the lever 156. The right hand end (FIGURE 4) of lever 156 carries a roll pin 164 extending perpendicularly outwardly from each side thereof so as to be located below the hinge pin 155. A trip lever 166 includes a top member 168 and perpendicular side members which have ends 170 and 172 extending beyond the top member toward the left end (FIGURE 5) of the frame sides 150 and 152. The connecting top member 168 is sufficiently wide to permit the lever sides 170 and 172 to straddle the frame sides 150 and 152, respectively. Intermediate their ends, each of the lever sides 170 and 172 have an apertured ear 174 through which the hinge pin 155 extends whereby the lever 166 is hingedly mounted on the frame ears 151 and 153. A coil spring encircles the hinge pin 155 and has one end 176 engaging the undersurface of frame top 154 and another end 178 engaging the undersurface of the lever top 168. The coil spring biases the lever 166 counterclockwise about the hinge pin 155 in order to return the lever 166 to its upright position (FIGURE 4) when the pneumatic actuator 36 is pressurized; the lever 166 is retained in its latched position (FIGURE 4) by means of the roll pin 164 being disposed in notched portions 180 and 182 in the lever sides 170 and 172, respectively. Adjacent the notches 180 and 182, the lever sides 170 and 172 are provided with edges sloping toward the side ends thereof to define cam edges 184 and 186, respectively, to facilitate return movement of the lever 166 by upwardly sliding the roll pin 164 thereon.

Whenever the lever 166 has been moved to its tripped position shown in FIGURE 5, the roll pin 164 is released from the notches 180 and 182 and the free end of lever 156 is disposed over the top of the reset pneumatic actuator device 36. As is shown on FIGURE 4, the pneumatic actuator includes an inlet port 36a leading to an internal passageway 190 which feeds a pressure chamber 191 that is sealed on one end by means of a gasket 192. A piston 193 is slidably disposed in the chamber 191 and is attached to one end of a piston rod 194 whose other end protrudes out of the casing of the pneumatic actuator device 36. A coil spring 195 surrounds the rod 194 and is mounted in compression between the piston 193 and the upper interior wall of the casing. A projection on the opposite side of the piston 193 defines a stop to prevent the spring 195 from forcing the piston 193 to the bottom of the chamber 191. An O-ring seal 196 in the periphery of the piston 193 seals the inlet port of chamber 191 from the outlet port which is vented to the atmosphere by an exhaust port 197.

In order to place the engine in operation, any conventional starting and ignition arrangements may be utilized whereby the conduits 16 and 32 are opened to the air supply. Thus a pneumatic flow through the restricting orifice 24 and conduit 22 pressurizes the diaphragm means 20 to transfer the valve 18; the pneumatic flow also proceeds into the conduit 26 but is blocked off because all the valves 30 are in closed positions. Actuation of the valve 18 closes the vent port 18c and establishes communication between ports 18a and 18b permitting the pneumatic flow through the conduit 14 to pressurize the diaphragm means 12; thus, the fuel valve 10 is transferred which closes the vent port 10c and establishes communication between the ports 10a and 10b permitting a flow of fuel to the engine.

As shown in FIGURE 4, with the crankshaft 48 rotating, the tip end of the rod 94 rotates in a fixed circle so that it just misses the end of lever 166 with a clearance indicated at C. Assume now that the formed cup 56 senses an abnormally high temperature at the bearing 50. Because the cup surface 58 is tangentially disposed to the bearing 50, a large area is subjected to the heat therefrom and because the cup 56 is made of thermal conducting material, such as copper, the excessive heat is transmitted to the thermal power element 62. Expansion of the thermal power element 62 causes its sleeve 72 to force its rod outwardly into engagement with the bottom wall of the recess 96 whereby the plunger 94 is moved downwardly against the bias of spring 100. As such displacement increases, the tip end of plunger 94 travels in an increasing larger circle until it strikes the end of lever 166 to pivot the same clockwise, as viewed in FIGURES 4 and 5, about the hinge pin 155. As soon as the roll pin 164 is released from the notches 180 and 182, the lever 156 is pivoted clockwise about the hinge pin 158 under the bias of the coil spring 162 whereby the lever 156 depresses the valve stem 136 to open the valve 138.

The lever 156 thus transfers the blocking valve 30 to establish communication between the inlet port 30a and the vent port 30b; the pneumatic flow in the conduit 26 and the diaphragm means 20 is now vented to the atmosphere causing the diaphragm means 20 to be depressurized and the valve 18 to be transferred back to its shut-off position. Because the atmospheric vent through the valve 30 is larger than the restricted orifice 24, the pneumatic flow from conduit 22 is not sufficient to pressurize the diaphragm means 20. The transfer of valve 18 closes the inlet port 18a and establishes communication between the outlet port 18b and the vent port 18c whereby the conduit 14 and diaphragm means 12 is bled to the atmosphere. Depressurizing the diaphragm means 12 transfers the fuel valve 10 to a shut-off position whereby the engine is shut down.

It is to be noted that the lever 166 may be manually reset from its tripped position to its latched position as by hand or some form of linkage extending into the engine; cam edges 184 and 186 are sloped sufficiently to cam the roll pin 164 and lever 156 back to engage roll pin 164 with notches 180 and 182. However, in the preferred embodiment automatic reset means is provided in the form of the pneumatic actuator 36. As soon as the temperature of bearing 50 decreases, the coil spring 100 will retract the stem 94 to its normal position. Automatic resetting is accomplished by actuation of the push valve 34 (FIGURE 1) whereby the vent port 34b is closed and communication is established between the inlet port 34a and the outlet port 34c to permit a pneumatic flow from conduit 32 through the inlet port 36a of the pneumatic actuator device and thence through passageway 190 into chamber 191. The pressure in chamber 191 moves the piston 193 and piston rod 194 upwardly as viewed in FIGURE 4, whereby the lever 156 is moved upwardly against the bias of coil spring 162. Such upward movement causes the roll pin 164 to roll up the cam edges 184 and 186 whereby the lever 166 follows under the bias of its coil spring until the roll pin 164 is positioned in the notches 180 and 182. Thus the valve 30 is again blocked permitting the diaphragm means 20 to be pressurized as described above. Upon release of the push button valve 34, the inlet port 34a is closed and communication is established between the outlet port 34c and vent port 34b whereby the chamber 191 is vented to the atmosphere and spring 195 returns the piston 193 to its position shown in FIGURE 4.

Assuming now that the bearing 50 should become worn, the connecting rod cap 52 will be displaced from its original position causing the complete sensor assembly and stem 94 to move in the same direction as described above with regard to movement from excessive temperature. However, in this instance, the shut down of the engine is maintained until proper corrections have been made such as replacing the worn bearing.

Inasmuch as the preferred embodiment of the present invention is subject to many modifications, variations and changes in structural details, it is intended that all matter contained in the foregoing description or shown in the accompanying drawing shall be interrupted as illustrative and not in a limiting sense.

What is claimed is:

1. In a safety control system for an engine, the combination comprising control means adapted to effect operation of the engine, bearing means for the engine, a sensor assembly having a contacting element including a thermally responsive power element engaging said bearing means and having an operating element disposed adjacent said control means, and an operative connection between said contacting element and said operating element whereby said operating element is displaced to actuate said control means in response to abnormal conditions sensed by said contacting element.

2. In a safety control system for an engine, the combination comprising bearing means for the engine, control means adapted to effect operation of the engine upon abnormal conditions of said bearing means, a sensor assembly having an operating element disposed adjacent said control means for actuating the same upon displacement of said sensor assembly in response to bearing wear, thermally responsive means in said assembly operable in response to temperature variations of said bearing means, and means connecting said thermally responsive means to said operating element to move the same for actuating said control means in response to bearing temperatures.

3. The combination as recited in claim 2 wherein said connecting means includes a housing surrounding and guiding said operating element, and spring means biasing said operating element against movement by said thermally responsive means.

4. The combination as recited in claim 2 wherein said thermally responsive means includes a surface element tangentially contacting said bearing means to present a large surface area in contact therewith.

5. The combination as recited in claim 2 wherein said control means includes a trip mechanism comprising a pivoted lever for actuating control stem means, a trip lever pivotally mounted for movement from an engine operating position to an engine shut down position by said operating element, and means interconnecting said pivoted lever and said trip lever to retain the same in an engine operating position.

6. The combination as recited in claim 5 wherein said interconnecting means comprises a notch means on said trip lever and pin means on said pivoted lever for cooperation with said notch means.

7. In a safety control system for an engine, the combination comprising bearing means for the engine, control means adapted to effect operation of the engine upon abnormal conditions of said bearing, a sensor assembly for said bearing means having a contacting element disposed in surface contact with said bearing means and having an operating element to actuate said control means in response to abnormal conditions of said bearing means, and reset means for said control means to reset the same upon correction of an abnormal condition.

8. The combination as recited in claim 7 wherein said control means comprises a tripping mechanism and said reset means comprises pneumatic actuator means to return said tripping mechanism to an engine operating position.

9. In a safety control system for an engine, the combination comprising bearing means for the engine; control means adapted to effect operation of the engine upon abnormal conditions of said bearing means; a sensor assembly having a contacting element engaging said bearing means and an operating element disposed adjacent said control means, a thermally responsive power element carried by said contacting element and including a plunger movable in response to temperature variations, a cylindrical housing for said operating element and being fixed to said power element, spring means in said housing biasing said operating element toward said plunger; a control device having a control stem movable between engine operating and engine shut down positions a tripping mechanism including a pivoted lever for actuating said control stem, a tripping lever disposed adjacent operating element for movement thereby, and interconnecting means between said tripping lever and said pivoted lever to retain said pivoted lever in an engine operating position; and, automatic reset means including a pneumatic actuator disposed adjacent said pivoted lever for returning the same from an engine shut down position to an engine operating position.

References Cited by the Examiner

UNITED STATES PATENTS

| | | | |
|---|---|---|---|
| 775,054 | 11/1904 | Waterman | 251—70 |
| 855,414 | 5/1907 | Rockwell. | |
| 1,675,780 | 7/1928 | Alric. | |
| 2,342,816 | 2/1944 | Peek | 74—2 |
| 2,400,399 | 5/1946 | Down et al. | |
| 2,435,343 | 2/1948 | Downey | 123—198 |

MARK NEWMAN, *Primary Examiner.*

FRED E. ENGELTHALER, *Examiner.*